(12) United States Patent
Razallian et al.

(10) Patent No.: US 12,585,660 B2
(45) Date of Patent: *Mar. 24, 2026

(54) TECHNIQUES FOR SEARCHING USING TARGET APPLICATIONS

(71) Applicant: Branch Metrics, Inc., Palo Alto, CA (US)

(72) Inventors: Sojan Ponthanplavil Razallian, Sunnyvale, CA (US); Eric J. Glover, Palo Alto, CA (US); Alexander Austin, Palo Alto, CA (US); Kan Yu, San Mateo, CA (US)

(73) Assignee: Branch Metrics, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,302

(22) Filed: Jul. 10, 2024

(65) Prior Publication Data

US 2024/0362239 A1      Oct. 31, 2024

Related U.S. Application Data

(63) Continuation of application No. 17/557,702, filed on Dec. 21, 2021, now Pat. No. 12,118,008, which is a continuation of application No. 16/385,202, filed on Apr. 16, 2019, now Pat. No. 11,216,471.

(60) Provisional application No. 62/658,882, filed on Apr. 17, 2018.

(51) Int. Cl.
*G06F 16/20* (2019.01)
*G06F 16/2457* (2019.01)
*G06F 16/248* (2019.01)
*G06F 16/25* (2019.01)

(52) U.S. Cl.
CPC ...... *G06F 16/24578* (2019.01); *G06F 16/248* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 10,180,833 B2 * | 1/2019 | Sogani | G06F 16/9558 |
| 2015/0227588 A1 * | 8/2015 | Shapira | G06F 16/9535 707/722 |
| 2017/0097936 A1 * | 4/2017 | Glover | G06F 16/2425 |

* cited by examiner

*Primary Examiner* — Jau Shya Meng
(74) *Attorney, Agent, or Firm* — RMCK Law Group PLC

(57) ABSTRACT

A user device includes a processing unit that executes a search application. Executing the search application causes the processing unit to receive a user search query, send the user search query to a plurality of target applications, and receive a set of search results from each of the target applications. Each search result includes application state access data configured to access an application state of the target application associated with the search result. Executing the search application causes the processing unit to rank the search results, display the ranked search results, and detect user selection of one of the displayed search results. Additionally, executing the search application causes the processing unit to send the application state access data associated with the selected search result to the target application associated with the selected search result and display the application state accessed using the application state access data.

20 Claims, 10 Drawing Sheets

TECHNIQUES FOR SEARCHING USING TARGET APPLICATIONS

CROSS-REFERENCE TO RELATED APPLICATIONS

This application is a continuation of U.S. Non-Provisional application Ser. No. 17/557,702, filed on Dec. 21, 2021, which is a continuation of U.S. Non-Provisional application Ser. No. 16/385,202, filed on Apr. 16, 2019, now U.S. Pat. No. 11,216,471, which claims the benefit of U.S. Provisional Application No. 62/658,882, filed on Apr. 17, 2018. The disclosures of the above-identified applications are incorporated herein by reference in their entirety.

FIELD

The present disclosure relates to providing search results for applications.

BACKGROUND

Software developers can develop websites and applications that are accessed by users on a variety of different platforms, such as different computing devices and operating systems. Example websites/applications may include e-commerce applications, media streaming applications, business review applications, social media applications, and news applications. These websites/applications can provide users with a variety of content. For example, an e-commerce application can provide consumer products for sale to users. As another example, a media streaming application can play movies or songs for a user.

Website and application search engines can search websites/applications for a user. For example, a user can enter a search query into a search engine and receive website and application search results for the search query in a search engine results page (SERP). The search results can include links to web/application pages including products for sale, images, videos, articles, and other types of files.

SUMMARY

In one example, a user device comprises memory including a search application and a processing unit configured to execute the search application. Executing the search application causes the processing unit to receive a user search query, send the user search query to a plurality of target applications included in the memory, and receive a set of search results from each of the target applications. Each search result includes application state access data configured to access an application state of the target application associated with the search result. Executing the search application causes the processing unit to rank the search results, display the ranked search results, and detect user selection of one of the displayed search results. Additionally, executing the search application causes the processing unit to send the application state access data associated with the selected search result to the target application associated with the selected search result and display the application state accessed using the application state access data.

In one example, a non-transitory computer-readable medium comprises computer-executable instructions, the computer-executable instructions causing a processing unit of a user device to receive a user search query, send the user search query to a plurality of target applications included on the user device, and receive a set of search results from each of the target applications. Each search result includes application state access data configured to access an application state of the target application associated with the search result. The computer-executable instructions cause the processing unit to rank the search results, display the ranked search results, and detect user selection of one of the displayed search results. Additionally, the computer-executable instructions cause the processing unit to send the application state access data associated with the selected search result to the target application associated with the selected search result and display the application state accessed using the application state access data.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

A search application 118 of the present disclosure communicates with partner applications installed on a user device. The search application 118 can receive a user's search query and subsequently query the partner applications based on the user's search query. The search application 118 can receive search results from the partner applications, rank the search results, and render the search results for user selection. User selection of a search result in the search application can cause the corresponding application to access the application state (e.g., application page) associated with the search result. Accessing a partner application state using data provided by the partner application itself may ensure a high level of certainty that the partner application will successfully access the proper application state. In some implementations, the search application 118 can receive search results that were personalized by the partner application according to user-specific data associated with the partner application.

Figure 1:
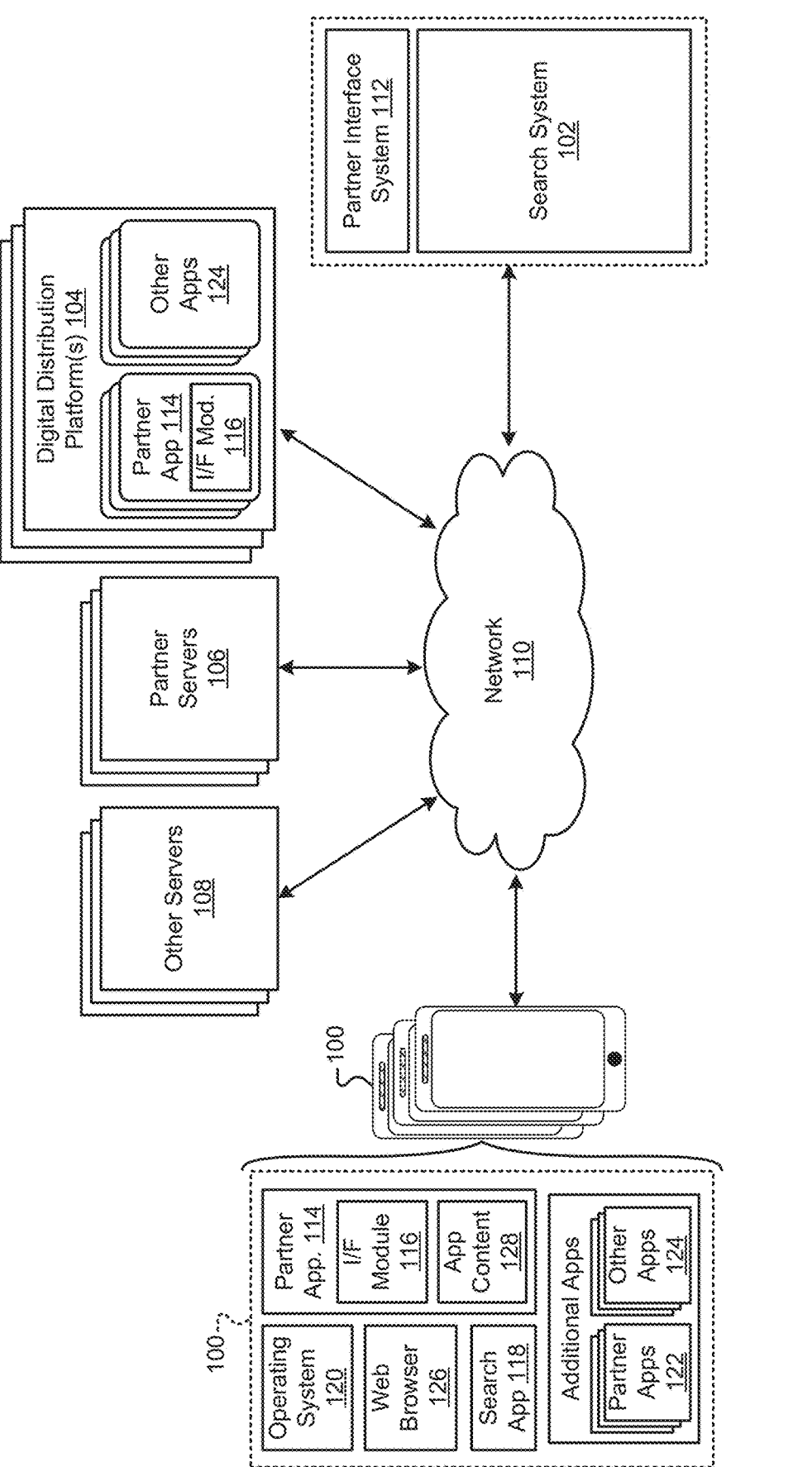
FIG. 1 illustrates an environment that includes a plurality of user devices that may communicate with a remote search system and other servers.

FIG. 1 illustrates an environment that includes a plurality of user devices 100 that may communicate with a remote search system 102 (e.g., a search server), digital distribution platforms 104, partner servers 106, and other servers 108 (e.g., other application servers and web servers). The user devices 100 may include a variety of different computing devices, such as a handheld computing device (e.g., a smartphone or tablet), a laptop computing device, and a desktop computing device. The devices, servers, and systems may communicate via a network 110. The network 110 may include various types of computer networks, such as a local area network (LAN), wide area network (WAN), and/or the Internet. Example digital distribution platforms 104 include, but are not limited to, the GOOGLE PLAY® digital distribution platform by Google, Inc. and the APP STORE® digital distribution platform by Apple, Inc.

FIG. 1 also includes a partner interface system 112 that may provide software components and services to partners of the owner/operator of the partner interface system 102. Example partners may include application developers that develop applications for installation on user devices 100. The partners integrate the software components into the partner applications 114, 122. The provided software components may include software libraries (e.g., functions) that developers can integrate into their applications. As described herein, the integrated software components may include an interface module 116 (e.g., see FIG. 1 and FIG. 5). Applications that include the provided software components may be referred to herein as "partner applications."

The user device 100 includes a search application 118. The search application 118 can communicate with a partner application 114 via the included interface module 116. For example, the search application 118 can receive a user's search query and make a search request to the interface module 116 of the partner application 114. The interface module 116 can request search results from the partner application's search functionality and send the search results to the search application 118 for display to the user. The search application 118 can retrieve and display search results from a plurality of partner applications in this manner.

In some implementations, the partner interface system 112 may provide software and/or services associated with the search application 118. For example, the partner interface system 112 may provide the search application/widget to the digital distribution platforms 104 for distribution to users via download. As another example, the partner interface system 112 may provide software components to partners for integration into an application that has features attributed herein to the search application 118. For example, the partner interface system 112 may provide software components for integration into other applications, widgets, and launchers. In some implementations, the partner interface system 112 may collect data (e.g., usage data) from the interface module 116 and/or the search application 118. The partner interface system 112 may also provide analytics to partners based on the collected data.

The user device 100 includes an operating system 120 and a plurality of installed applications. The user device 100 includes additional partner applications 122 and other applications 124. Other applications 124 may refer to those applications that do not include the interface module 116. The user device 100 may also include one or more web browser applications 126. In some implementations, the web browser applications 126 may include the interface module 116 and/or components that provide the functionality associated with the search application 118. Example types of applications may include, but are not limited to, e-commerce applications, social media applications, business review applications, banking applications, gaming applications, and weather forecast applications.

The partner application 114 can include application content 128 that the partner application's search functionality can search and return in search results. In some cases, the application content 128 may be content that is stored on the user device 100 (referred to as "local application content"). Additionally, or alternatively, the application content 128 may be stored remotely from the user device 100 (referred to as "remote application content"), such as on a partner server 106 or other server. Application content 128 and the location where content is stored may vary among partner applications. For example, an application that provides restaurant reviews may include restaurant data, such as a restaurant name, location, and reviews. In another example, a weather application may include weather data, such as weather forecasts for different locations. In some implementations, partner applications may include advertisements in the search results.

Some partner applications may generate content for search results algorithmically on the user device and/or on a remote partner server. This application content may be referred to as "locally generated content" and/or "remote generated content." In one example, a computational knowledge application or answer engine (e.g., Wolfram Alpha developed by Wolfram Alpha LLC) may perform mathematical calculations based on a search query. In another example, a ride sharing application may determine the location of vehicles available for transporting a user. Example ride sharing applications may include the UBER® application developed by Uber Technologies Inc. and the LYFT® application developed by Lyft, Inc.

Although the search application 118 can operate locally on the user device 100 and communicate locally on the user device 100 with the partner applications 114, in some implementations, the search application 118 may communicate with the search system 102. For example, the search system 102 may index search results from partner applications 114 and other sources (e.g., see FIG. 7). The search system 102 may also provide search results to the search application 118 in some implementations.

Figures 3A, 3B, 3C:
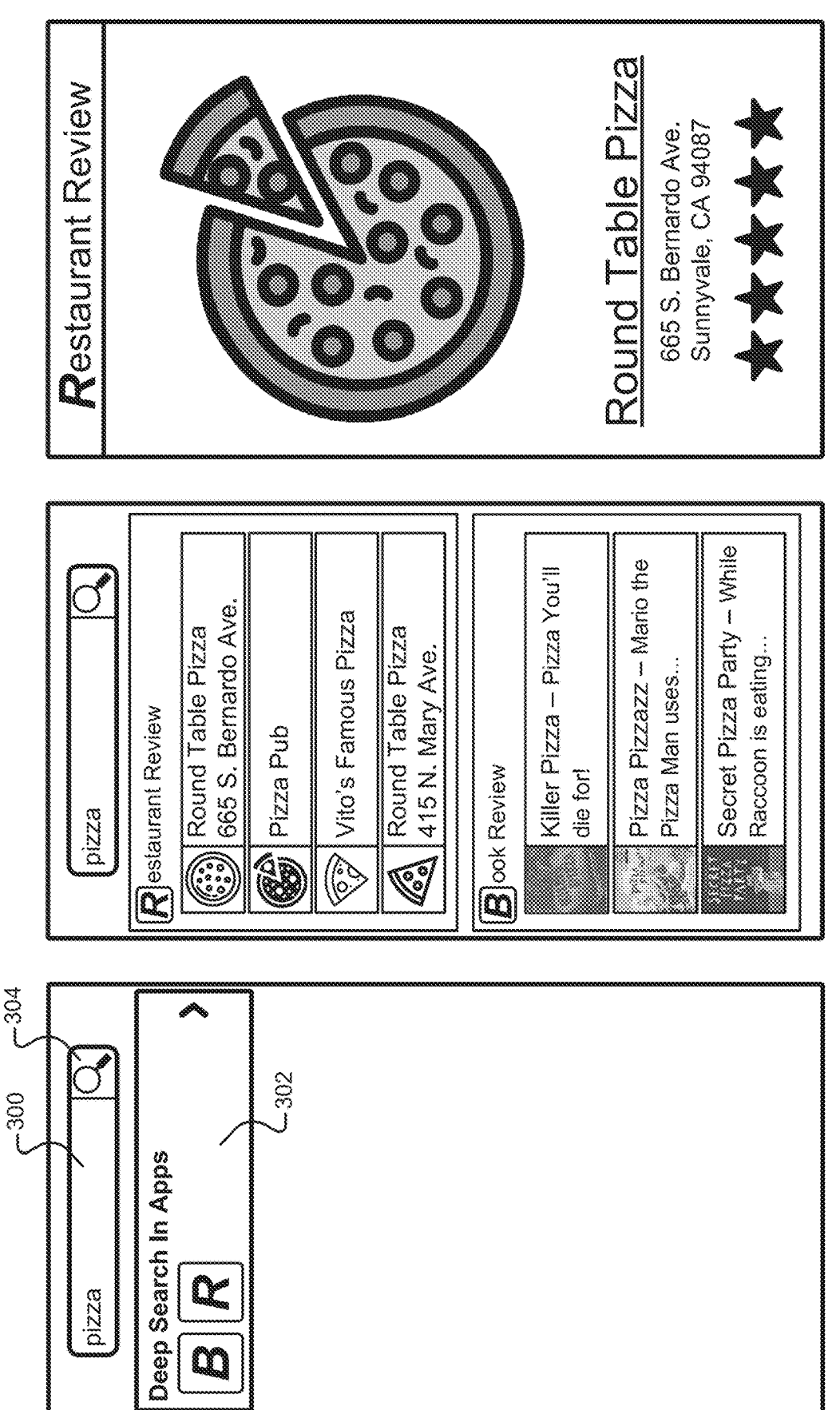
FIGS. 3A-3C illustrate example graphical user interfaces (GUIs) that may be displayed on a user device.

Search results received by the search application 118 can include display data and formatting data for rendering the results. The search results can also include search result metadata. The search result metadata can include data for accessing the application state associated with the search result. The metadata for accessing an application state may be referred to as "application state access data" (hereinafter "state access data"). An application state may generally refer to a page/screen of the application. In the example of FIGS. 3B-3C, selecting the Restaurant Review application search result for Round Table Pizza in FIG. 3B accesses the Round Table Pizza application state of the Restaurant Review native application illustrated in FIG. 3C.

The user can select one of the search results in the GUI. The search application 118 can pass result selection data to the partner application associated with the selected search result. The partner application can open the application state associated with the search result using the result selection data. In some examples, the result selection data can include the state access data received in the search result metadata. Providing the state access data back to the partner application helps ensure a high level of certainty that the partner application will successfully access the proper application state.

The partner applications can also include user-specific data, such as user preferences and user historical data (e.g., usage data). A partner application can generate personalized search results based on the user preferences and user historical data. Accordingly, in some cases, the search application 118 can retrieve personalized search results from a plurality of partner applications. Example personalized search results may include, but are not limited to: 1) personalized shopping results that are based on previous user purchases and/or that use the user's shipping address (e.g., see FIG. 9), 2) restaurant review results that are based on a user's cuisine/price preference, and 3) stock market results that indicate a user's gains/losses.

Although the technology associated with the search application 118, interface module 116, partner interface system 112, and the search system 102 are described herein as being provided to partners (e.g., software developers), the technology may be implemented in other manners. For example, one or more parties may implement the technologies described herein according to different arrangements. Accordingly, the partner interface system 112 may also be referred to generally as an "interface system 112," and the partner applications may also be referred to as "target applications."

The user devices 100 described herein can execute the search application 118, partner applications, and other applications. The user devices 100 can include electronic hardware that implements the functionalities attributed to the user devices 100 herein. For example, a user device 100 can include one or more processing units (i.e., processors), such as central processing units (CPUs) and/or graphics processing units (GPUs). A user device 100 can also include memory (e.g., main memory, such as random-access memory), a storage device (e.g., a hard disk drive and/or solid state drive), and a network device. The components of a user device 100 may be interconnected by a bus or other communication circuitry. User devices 100 may also include additional components.

The processing unit of a user device 100 can execute computer-executable instructions in the memory. For example, a processing unit can execute the search application, partner applications, an operating system, the web browser application, and additional applications, all of which can be implemented as computer-executable instructions. The memory and storage device of a user device 100 can include one or more computer-readable mediums (e.g., random-access memory, hard disk drives, solid state memory drives, flash memory drives, etc.) that can store any suitable data that is utilized by the operating system and/or any of the applications that are executed by the user device. In some implementations, the storage device may include non-volatile memory. The network device may be configured to perform wired and/or wireless communication with the network.

Figure 2:
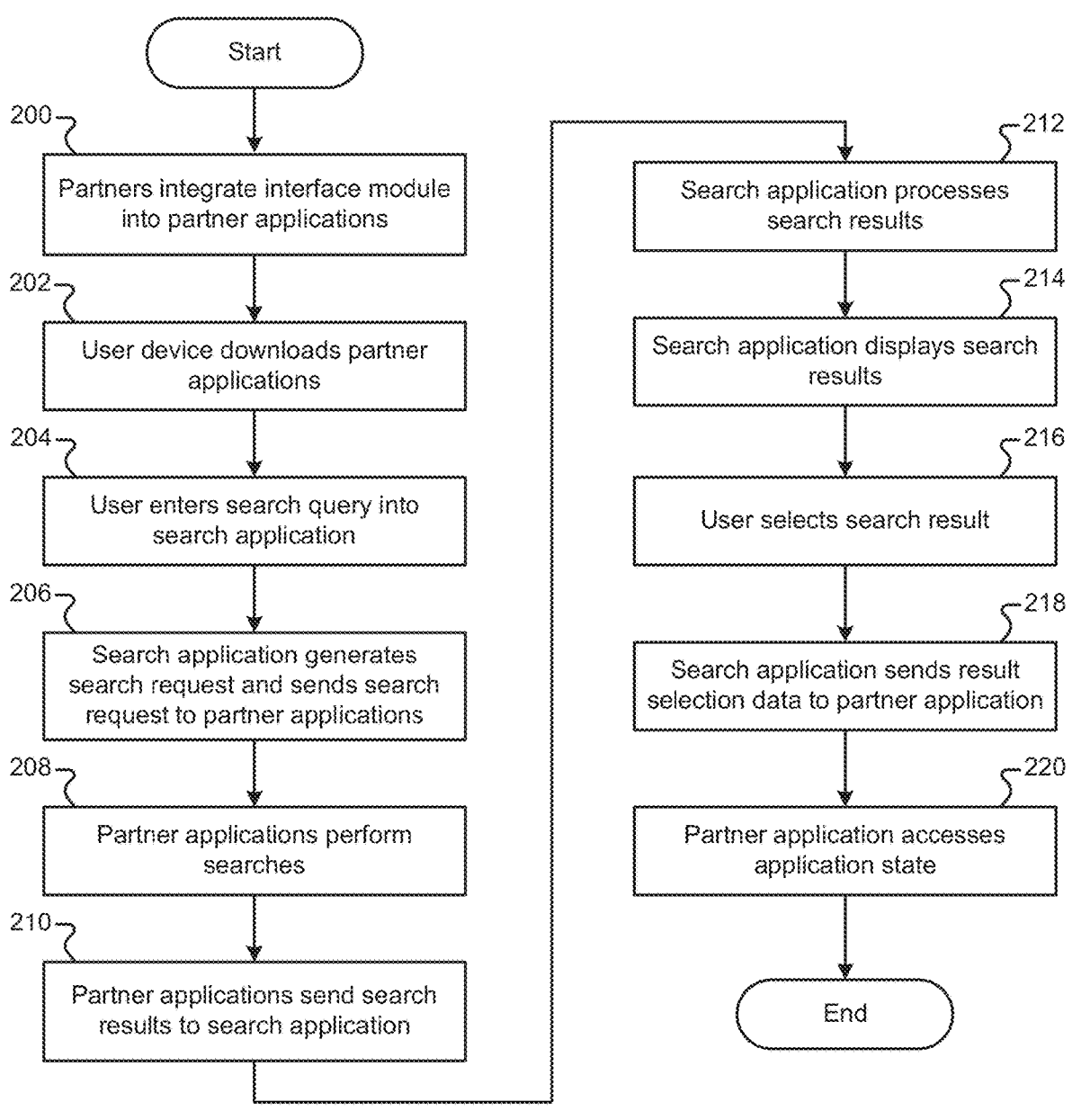
FIG. 2 illustrates an example method that describes operation of the environment illustrated in FIG. 1.

FIG. 2 illustrates a method that describes operation of the environment illustrated in FIG. 1. Initially, in block 200, the partners integrate the interface module 116 into their applications. A partner may retrieve the interface module 116 from the partner interface system 112. The partner interface system 112 may also provide directions to the partners for integrating the interface module 116 into their applications. For example, the partner interface system 112 may provide written documents (e.g., hypertext markup language documents) and code examples describing integration with an example application for the partners to follow. Example integration of the interface module 116 may include defining formatting templates that control how search results are formatted and defining search result metadata to be associated with the search results.

In block 202, a user device 100 downloads and installs the partner applications 114 from a digital distribution platform 104. The user device 100 may include a search application 118 that communicates with the partner applications 114 via the interface module 116. The search application 118 may be implemented on the user device 100 in a variety of ways. In some implementations, the user may download the search application 118 (e.g., from a digital distribution platform 104) and install the search application 118 on the user device 100. In other implementations, the search application 118 may be installed on the user device 100 before the user purchases the user device 100 (e.g., as a preloaded application). In some cases, the search application 118 may be referred to as a "native application" or a "widget." In some implementations, the functionality attributed to the search application 118 herein may be included in other applications, such as a launcher application or as part of a smart assistant device, such as a smart speaker device that may include a wireless speaker/microphone and voice command functionality that can receive search queries and deliver audible search results.

In block 204, the search application 118 provides a GUI element (e.g., a query box) into which the user enters a search query. In block 206, the search application 118 generates a search request and sends the search request to the partner applications 114. In block 208, the partner applications 114 perform searches on the user device 100 and/or on a remote partner server 106 based on the received search request. In block 210, the partner applications 114 send the search results to the search application 118. In blocks 212-214, the search application 118 receives the search results, processes the search results, and then displays the search results to the user.

In block 216, the user selects one of the search results. In response to selection of a search result, the search application 118 sends result selection data to the partner application associated with the search result in block 218. In block 220, the partner application accesses the application state based on the received result selection data. The user may then interact with the accessed application state.

In some implementations, the search application 118 may send the search request to the search system 102 in addition to the partner applications 114. In these implementations, the search system 102 may perform a search and return search results to the search application 118. In some cases, the search results generated by the search system 102 may be for applications that are not partner applications installed on the user device 100. The search application 118 may handle selection of these search results in a variety of ways, such as accessing a web resource or redirecting the user to a digital distribution platform 104 for downloading the non-installed application.

FIGS. 3A-3C illustrate example GUIs that may be displayed on the user device 100. FIGS. 3A-3B illustrate example GUIs generated by the search application 118 (e.g., the UI module 506 of FIG. 5). FIG. 3C illustrates an application state for the Restaurant Review application that launched in response to selection of a search result in FIG. 3B.

Referring to FIG. 3A, the GUI generated by the search application 118 includes a query box 300. In FIG. 3A, the user has entered a query for "pizza." The search application 118 includes a GUI element that lists the partner applications installed on the user device. Specifically, the GUI indicates that the user may perform a deep search (i.e., an in-app search) with the Book Review application and the Restaurant Review application. The Book Review application is a fictional application that provides reader reviews and descriptions for books. The Restaurant Review application is a fictional application that provides restaurant information and reviews. In the GUI of FIG. 3A, the user may select the "Deep Search In Apps" button 302 or the search button 304 to initiate the search.

In response to the user initiating the search in the GUI, the search application 118 may generate a search request including the search query "pizza." The search application 118 sends the search request to the installed Restaurant Review application and the installed Book Review application. The Book Review application and the Restaurant Review application perform searches on the user device 100 and/or their respective partner servers. The Book Review application and the Restaurant Review application then return search results to the search application 118.

The GUI of FIG. 3B illustrates the search results rendered by the search application 118. The search results received from the partner applications may include display data such as text, images, and formatting data that the search application 118 used to render the results. The Restaurant Review application returned search results for different pizza restaurants, such as 1) a first Round Table Pizza location, 2) Pizza Pub, 3) Vito's Famous Pizza, and 4) a second Round Table Pizza location. The Book Review application returned search results for literary content, such as 1) a Killer Pizza book, 2) a Pizza Pizzazz book, and 3) a Secret Pizza Party book. The user can select any of the search results illustrated in FIG. 3B. For example, the user may touch or click the search results to make a selection.

The user selects the first Round Table Pizza location in the search results of FIG. 3B. In response to selection of the search result, the search application 118 sends result selection data to the Restaurant Review application indicating that the Round Table Pizza result has been selected. The Restaurant Review application receives the result selection data and opens the Restaurant Review application to the Round Table Pizza application state of FIG. 3C that provides details (e.g., a pizza image, address, and five star rating) for the first Round Table Pizza location. As described herein, the search result data for the selected Round Table Pizza location may include search result metadata for accessing the application state. For example, the search result metadata may include a restaurant ID number for the first Round Table Pizza location that the Restaurant Review application can use to uniquely identify the restaurant. The result selection data transmitted to the Restaurant Review application may include the search result metadata received in the search result. The Restaurant Review application may use the search result metadata to open the application as illustrated in FIG. 3C.

An example application that provides functionality similar to the Restaurant Review application is the YELP® application developed by Yelp, Inc. The YELP® application may provide reviews for businesses (e.g., restaurants), maps to businesses, and photos for businesses, among other features. The YELP® application may identify different application states for businesses by using unique business identifiers (IDs), such as unique strings of numbers and/or letters. In a case where the search application 118 communicates with the YELP® application, the result selection data may include the unique business ID or other values that the YELP® application can use to access an application state.

Search results are described herein as being ranked (e.g., according to relevance). Additionally, the results illustrated herein are grouped by application. Within each application group of results, the results may be displayed in a list format, where higher ranked results (e.g., more relevant results) are displayed at the top of the list. Although the search results may be grouped by application, in other implementations, the search application may intermix the search results of different applications (e.g., based on relevance).

Although the GUIs illustrated herein (e.g., FIGS. 3B, 6B, and 6C) include search results for accessing native application content, in some cases, some of the search results may include web-based search results that cause the web browser 126 to access web-based content.

Figure 4:
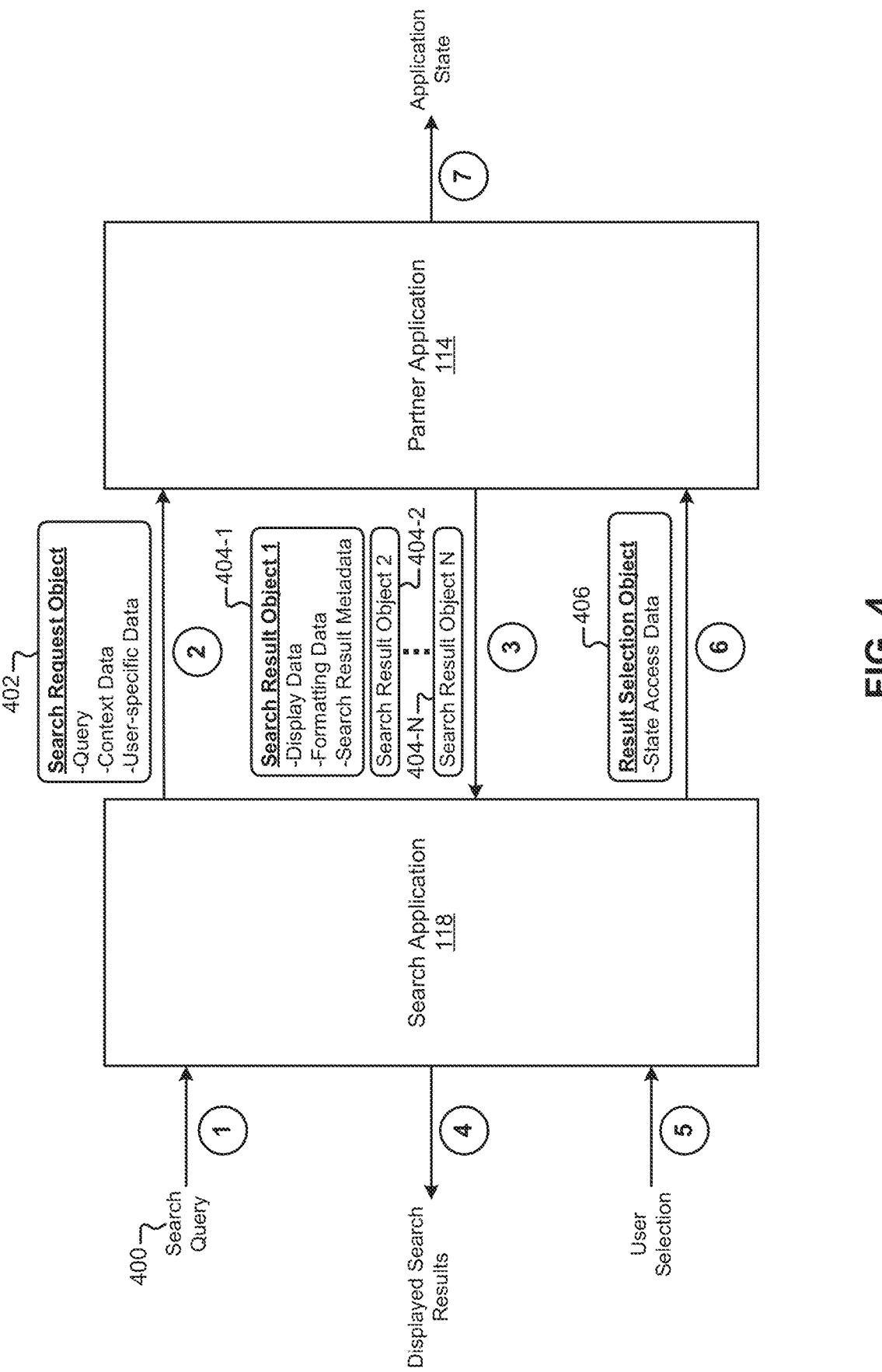
FIG. 4 is a functional block diagram that illustrates communication between a search application and a partner application on a user device.

FIG. 4 illustrates communication between the search application 118 and a partner application 114 on the user device 100. The search application 118 receives a search query 400 from the user and generates a search request data object 402 (i.e., a search request) that is sent to the partner application 114. The partner application 114 performs a search and generates search results (e.g., search result data objects 404-1, 404-2, . . . , 404-N) that are sent to the search application 118 for display. The user selects one of the search results and the search application 118 sends the result selection data 406 (e.g., result selection data object 406) to the partner application 114 in order to launch the application state. The search request, search results, and result selection data are described hereinafter with respect to FIG. 4.

Initially, the user enters a search query into the search application 118. The search application 118 generates a search request data object 402 (i.e., a search request) based on the search query and other data. In some implementations, the search application 118 can acquire context data to include in the search request. Context data may include a variety of types of data, such as geolocation data, time of day, query history (e.g., one or more prior queries in the search application), application usage data, user state of motion data (e.g., walking, biking, driving), user-historical context (e.g., all of the above historically), and/or category of the query (e.g., selected in the GUI).

In some implementations, the search application 118 can include user-specific data in the search request 402, such as user preferences and/or user historical data associated with the search application 118. Example user-specific data may include, but is not limited to, user demographic data, user geo-location preferences, past queries, and categorical preferences, such as cuisine preferences or hotel preferences. The search application data store may store the user-specific data associated with the search application.

The partners can configure the data that is included in the search result data objects 404 (i.e., the search result objects). Each search result object 404 can include 1) display data, 2) formatting data, and 3) search result metadata (e.g., application state access data). Note that a single search result object may be referred to herein as a search result. As such, search results may include a plurality of search result objects. The description of search results as including multiple search result objects is for description purposes only. As such, search results may be sent from the partner applications and/or search system to the search application in a variety of formats, which may be similar to the search objects described herein.

The display data and the formatting data can be used by the search application 118 (e.g., the UI module 506) to display the search results in the GUI. The display data may include, but is not limited to: 1) the partner application name, 2) the title of the result (e.g., a restaurant name), 3) a description of the state associated with the result (e.g., a description of a restaurant), and 4) one or more images associated with the application state.

The formatting data (i.e., the formatting data object) indicates how the display data should be rendered. The formatting data may specify a variety of formatting parameters for the display data, such as font size, font type, whether the font is bold/underlined, color, and position of the font and images. For example, the formatting data may specify such formatting parameters for the different fields of display data, such as the title, description, and image(s). In some cases, the formatting data may specify fields returned from the partner application, such as ratings, review counts, a field indicating that the user previously purchased an item, or a field indicating that the user has previously visited a business. In some cases, formatting data may specify links to images or other data used to produce the rendered result. The search application 118 (e.g., the UI module 506) reads the formatting data and applies the formatting data to the different data fields in the display data.

Although the formatting data may be included with the search results, the formatting data may be acquired by the search application 118 in other manners. In some implementations, the search application 118 can retrieve the formatting data from each partner application outside of a search query, such as upon installation of the partner application, during building of the list of partner applications, or at another time. In some implementations, the search application 118 can retrieve the formatting data from the partner server. In some implementations, the search application 118 may include a default formatting data object that the search application 118 uses for formatting search results in the case that the search application 118 has not received formatting data from the partner application. In some implementations, the search application 118 may include multiple formatting data objects, and the partner applications may specify which of the formatting data objects to use when formatting search results.

A partner application can use different formatting data objects for different scenarios. For example, a business review application may have a first formatting data object to use for restaurant search results, and a second formatting data object to use for retail store search results.

In some implementations, the interface module 114 provided to the partner may include a default formatting data object. In some cases, the application developer can use the default formatting data object. In other cases, the application developer may modify the formatting data object so that the formatting data object is application specific. In this manner, developers can control how search results for their applications are displayed on the user devices.

In some implementations, the formatting data object may specify how search results are displayed at the search-result level (e.g., per search result). The formatting data object may also specify how the search results are displayed at a group level, such as how a group of search results for an application are displayed. For example, the formatting data object may specify that higher ranked results should be displayed more prominently (e.g., larger) than lower ranked results.

The search result metadata may include data fields that are defined by the partner. The search result metadata may be used for a variety of purposes. In some implementations, the search result metadata may include application state access data that specifies a state of the partner application. The state access data may later be sent to the partner application in result selection data if the partner selects the search result.

Software developers may develop websites and corresponding native applications that provide similar functionality and content. For example, such corresponding websites and native applications may include webpages and application states that include similar content. In some cases, the search result metadata may include a web uniform resource locator (URL) for accessing a web version of the application state.

The search result metadata may also include text metadata associated with the partner application and/or the specific application state. Example text metadata may include keywords associated with the application and/or the application state. Text metadata may also include other text included in the application state associated with the search result, such as the text presented to the user when the application state is accessed. The search result metadata may also include geo-location metadata, such as the geo-location of an entity associated with the application state (e.g., a restaurant location). In some implementations, the search application can use the search result metadata (e.g., keywords and text metadata) to rank the search results.

In a specific example, a search result for a restaurant in the YELP® application may include display data, such as an image for the restaurant, a title of the restaurant, and a description of the restaurant (e.g., location and cuisine type). The search result may also include search result metadata, such as a YELP® restaurant ID that uniquely identifies the restaurant. The search result metadata may also include keywords, such as cuisine type, whether the food is organic, and cuisine price. The search result metadata may also include a geolocation of the restaurant.

When the user selects a displayed search result in the GUI, the search application 118 may send a result selection data object 406 (i.e., result selection data) to the partner application 114. In some implementations, the result selection data 406 may include data from the search result object 404, such as state access data. In some implementations, the result selection object 406 may be the same data that was sent in the search result object associated with the selected result. The interface module 116 may access the application state associated with the state access data. Providing such a structured data object (e.g., the state access data) back to the partner application 114 may help ensure that the partner application 114 can reliably access the proper application state, even if the application state is based on personalized data. In a specific implementation on the ANDROID® operating system developed by Google Inc., the search application 118 (e.g., a software development kit in the search application 118) can send an intent to a target application along with the selected data. The ANDROID® operating system may then open the target application specified by the intent. The interface module 116 in the target application (e.g., an SDK in the target application) can then capture the data in the intent and pass the data to the target application when the target application is opened.

In some implementations, the search application 118 may provide information to one or more partner applications after rendering the search results. For example, the search application 118 may indicate to one or more partner applications whether the search results for the partner applications were shown to the user. Additionally, the search application 118 may indicate to the partner applications the relative ranking of the search results that were shown to the user. Such information provided to the partner applications may help the partners improve their applications' search function.

The data included in the search request 402, search results 404, and result selection data 406 described herein are only examples. The developers of the partner applications can configure the search request 402, search results 404, and result selection data 406 according to their specifications.

Figure 5:
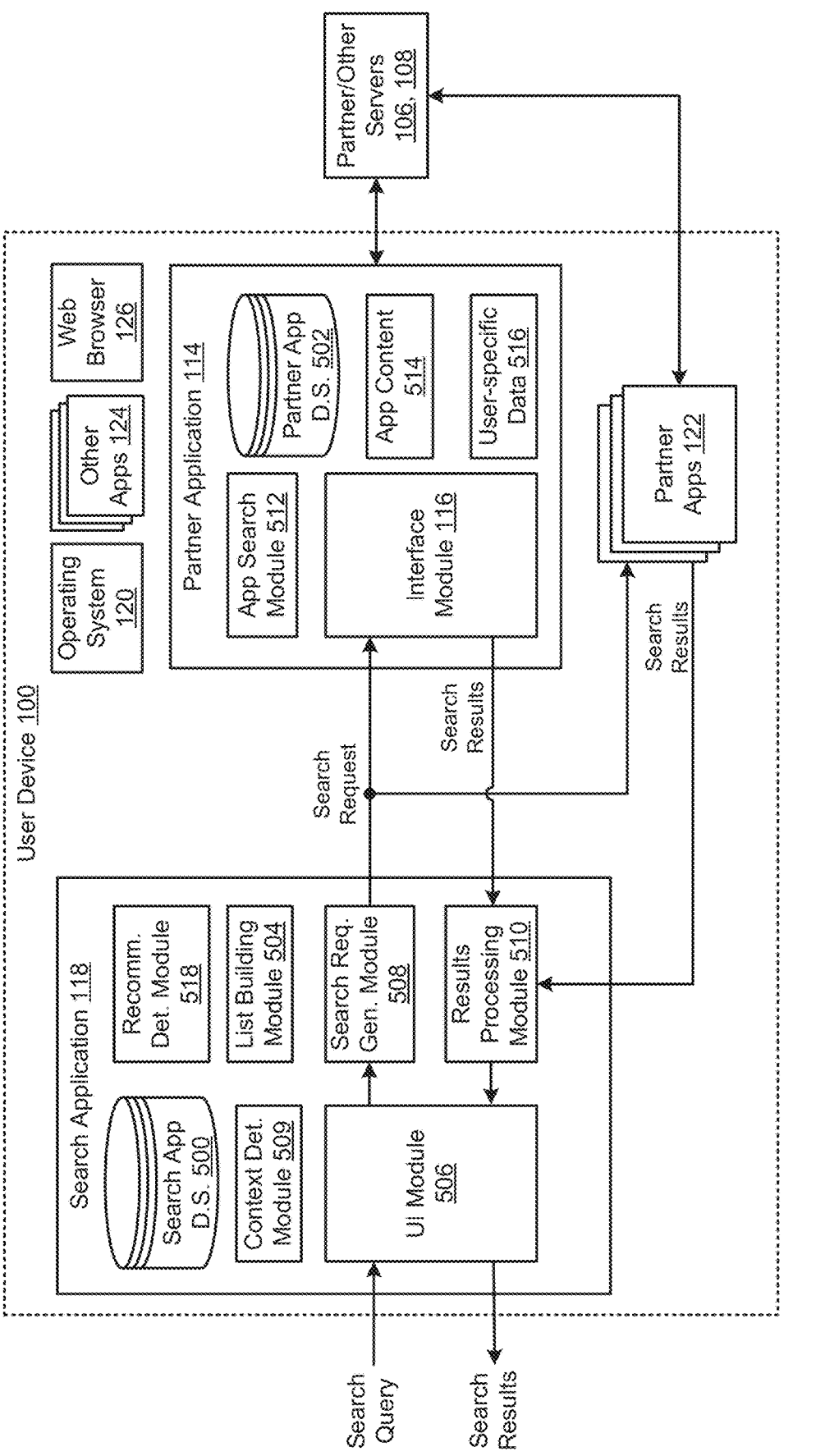
FIG. 5 is a functional block diagram illustrating details of an example search application and an example partner application installed on a user device.

FIG. 5 is a functional block diagram illustrating details of an example search application 118 and an example partner application 114 installed on a user device 100. The search application 118 and the partner application 114 include a variety of modules that provide the functionality attributed to the search application 118 and the partner application 114 herein. The modules are for illustration purposes. As such, implementations of the search application 118 and partner applications 114 can include different arrangements of modules. FIG. 5 includes arrows illustrating communication between modules. Some arrows have been omitted for illustration purposes (e.g., in order to simplify FIG. 5). The search application data store 500 represents data that can be stored on the user device 100 for use by the search application 118. The partner application data store 502 represents data that can be stored on the user device 100 for use by the partner application 114.

The search application 118 includes a list building module 504 that builds a list of partner applications installed on the user device 100. In some implementations, the search application 118 (e.g., the list building module 504) may be configured to build the list of partner applications upon installation, such as during the installation of the search application 118 and/or upon starting the search application 118 for the first time. The search application 118 may also detect installation of new partner applications and add the new partner applications to the list of partner applications. For example, newly installed partner applications may notify the search application upon installation.

In some implementations, the search application 118 and/or the partner applications 114 can implement a permission/authentication protocol. For example, the search application 118 and/or the partner applications may request permission from the user in order to provide personalized search results. The permission request may be a request for access to data or other features from a partner application, such as personalized results. Implementing a permission/authentication protocol may prevent unauthorized applications from acquiring personalized information, thereby protecting user privacy.

Permission can be requested at different times. In some implementations, the search application 118 and/or the partner applications can request permission during or after installation (e.g., prior to use). In some implementations, the search application 118 and/or the partner applications can request permissions when the search application 118 is building the list of partner applications. In some implementations, the search application 118 and/or the partner applications can request permission when the search request is made to the partner application.

In some implementations, the partner application 114 can be configured to automatically grant permission to the search application 118 in response to a permission request. In other implementations, the search application 118 and/or the partner application 114 can prompt the user to approve the permission request. The developers of the search application 118 and/or the partner applications can configure the applications to automatically provide permission and/or request the permission from the user. In some cases, the search application 118 may provide a developer identifier or package identifier to the partner application 114. The partner application 114 may accept permissions from specific search applications and reject others. In some cases, digital signatures may be used to provide the identification. In some cases, the operating system may provide package information to the partner application.

In cases where the applications are configured to prompt the user for permission, the applications can generate a GUI that prompts the user to give permission. The GUI can include text indicating that the user's permission is being requested for the search application 118 to access data on one or more partner applications. For example, the GUI may display a text request to the user, such as "Do you wish to provide personalized content to the search application?" The GUI can also include a yes/no GUI element that the user can select to provide/deny their permission.

The search application 118 includes a user-interface module 506 ("UI module 506") that provides a variety of user interface functions. For example, the UI module 506 may generate a GUI on the display of the user device 100 (e.g., see FIGS. 3A-3B). The GUI may receive the user's search query, display received search results, receive the user's selection of the displayed search results, and send the selection data to the partner application.

The search application 118 includes a search request generation module 508 (hereinafter "search request module 508") that generates a search request that can include the search query and context data. The search application 118 includes a context determination module 509 that can acquire the context described herein. The search request module 508 may send the search request to the partner applications indicated in the list of partner applications. For example, the search request module 508 may send the search request to all of the partner applications, or a subset of the partner applications.

In some implementations, the search request module 508 can rank and/or filter the partner applications in the partner application list prior to sending the search request. For example, the search request module 508 may rank the partner applications based on the query, context, and/or user-specific data. The rank of a partner application may indicate the likelihood that the partner application will provide relevant search results (e.g., relevant search results for the query and context). For example, a higher ranked partner application may have a higher likelihood of providing relevant search results than a lower ranked partner application.

The search request module 508 can rank the partner applications based on a variety of factors. In some implementations, the search request module 508 may rank the partner applications based on application engagement, such as the total usage of the partner applications or the usage of the partner applications during the current time of day. For example, more frequently used partner applications may be ranked higher in the partner application list. In some implementations, the search application 118 can track which partner application's search results are selected. In these implementations, the search request module 508 may rank partner applications higher in the partner application list that are more frequently selected in the search results. In some implementations, the search request module 508 may also rank the partner applications based on the potential response times of the partner applications and/or the potential load the partner applications may place on the user device 100 and/or the search system 102. For example, the search request module 508 may rank partner applications with faster response times higher in the partner application list. In some implementations, the search application 118 and/or the search system 102 can rank the partner application list using semantic analysis and knowledge of contents in the partner application. For example, if the search query is "Deliver food" or "Cater," then the search application 118 and/or the search system 102 can rank partner applications associated with food delivery higher in the search results.

In some implementations, the search request module 508 may filter the partner application list. For example, the search request module 508 may filter out (i.e., remove) partner applications from the list. In one specific example, the user can select one or more search categories for the search application 118 using the search GUI. In this example, the search request module 508 may filter out applications that are not included in the one or more selected search categories. The search request module 508 may also rank partner applications on a per-category basis.

In some implementations, the search request module 508 may use the ranked and/or filtered partner application list to determine which partner applications should receive the search request and/or determine the order in which to send the search request. In some examples, the search request module 508 can send the same search request to each of the partner applications in the list (e.g., in parallel). In some implementations, the search request module 508 may send the search request to each of the applications sequentially. For example, the search request module 508 may send the search request to each partner application in the order in which the partner application is ranked in the partner application list (e.g., highest rank to lowest rank). Sending the search request sequentially may help minimize the loading on the user device 100 and/or the search system 102.

In some implementations, the search application 118 (e.g., the results processing module 510) may rank later received search results based on the ranking of the partner applications. For example, the ranking of the partner applications can be used as a component of search result ranking.

The interface modules of the partner applications receive the search requests sent by the search request module 508. The interface module 116 interfaces with the application content search module 512 (hereinafter "app search module 512"). The app search module 512 implements the partner application's search functionality.

The partner integrates the interface module 116 with the partner application 114 in order to receive the search request. The partner also integrates the interface module 116 to the app search module functionality so that the interface module 116 can receive the search results generated by the app search module 512. The interface module 116 sends the search results to the search application 118 (e.g., the results processing module 510). The interface module 116 may format the search results for transmission to the search application 118. For example, the interface module 116 may format the search results into the search result data objects 404 described herein.

The app search module 512 represents the search functionality provided by the developer. The app search module functionality varies by partner application, depending on the type of content provided by the partner application. Accordingly, different app search modules may generate search results in different ways.

In some examples, the app search module 512 searches the local application content 514 based on the received search request. Additionally, or alternatively, the app search module 512 can perform a remote search on the partner server 106. In some examples, the app search module 512 may generate content for search results algorithmically on the user device 100 and/or on a remote partner server 106 (e.g., locally/remote generated content). Example factors used in generating search results may include relevance to the search query and context (e.g., geo-location and the user's state) along with user-specific data 516.

The partner applications can use user-specific data when generating search results (e.g., when ranking and/or filtering results). Example user-specific data may include, but is not limited to: 1) preferences that are expressed by the user in the partner application, 2) preferences that are determined by the partner applications without explicit expression by the user (e.g., user demographic data), 3) user historical data, such as past usage of the partner applications (e.g., past queries entered, past states visited), and 4) user-specific rewards from partner applications (e.g., redeemable rewards/coupons).

User-specific data may vary by partner application. For example, in a business review application, the user may specify that they prefer vegetarian cuisine and/or low cost meals. In this example, the business review application may rank and/or filter restaurant results based on the type/price of cuisine served at the restaurant, whereas other applications that do not include such preferences may generate search results without regard to cuisine type/price. In another example, the user may define a preferred geographic radius in a partner application. In this example, the partner application may filter out search results that are outside of the geographic radius, whereas other applications that lack the preferred geographic radius may return results outside of the geographic radius. In another example, a ride sharing application may include user historical data indicating past rides taken by the user. In this example, the ride sharing application may provide a discount reward to the user based on the user historical data, whereas other ride sharing applications may not.

In some implementations, the search application 118 can also include user-specific data described herein, such as 1) preferences that are expressed by the user in the search application 118 (e.g., a UI selected search category), 2) preferences that are determined by the search application 118 without explicit expression by the user, and 3) user historical data (e.g., past search queries). In some implementations, the search application 118 can send user-specific data to the partner applications for use in generating search results. Accordingly, the partner applications can generate personalized search results based on user-specific data associated with the search application 118.

As described herein, the search application 118 may receive search results from partner applications that are personalized according to the user-specific data associated with the partner applications. Search results that are generated based on user-specific data may be referred to as "personalized search results." In some implementations, a partner application may generate personalized search results based on the user-specific data that is internal to the partner application and/or partner servers. Additionally, or alternatively, a partner application may generate personalized search results based on user-specific data associated with the search application 118, such as user-specific data sent from the search application 118 to the partner application.

The app search module 512 sends the search results to the interface module 116, which then sends the search results to the search application 118 (e.g., the results processing module 510). In some implementations, the search application 118 may maintain the ranking of the search results received from the partner applications. In other implementations, the results processing module 510 may provide additional ranking and/or filtering of the search results.

The results processing module 510 can rank search results based on a variety of factors, such as app engagement (e.g., overall app usage or usage at a time of day), context (e.g., geolocation and the user's state), and/or user-specific data. The results processing module 510 may also rank search results based on the content of the search results (e.g., search result metadata and display data). For example, search results may include content that can be used for ranking, such as an application name, search result title, result description, and other result metadata. The results processing module 510 may perform matching between the search query and the content in order to rank the search results.

In some implementations, the search application 118 (e.g., the UI module 506) may group the search results by application. In these implementations, the search application 118 may display an application's search results as they are received, with the first received search results appearing higher in the list. In other implementations, the search application 118 may display an application's search results according to the rank of the partner application in the partner application list (e.g., higher ranked applications appear higher in the results). In some implementations, the search application 118 may group the search results according to the categories of the applications associated with the search results.

Search result metadata can include ranking metadata that indicates the rank of each of the search results for the partner application. In some examples, the ranking data may be implied by the order of the search results sent from the partner application. In other examples, the ranking metadata may include numbers that indicate the rank of the search results for a partner application. Example numbers may include integers that indicate the rank. Other example numbers may include relevance scores calculated by the partner application/server that indicate the relevance of the results to the search query and context. For example, relevance scores may include decimal values (e.g., 0.000-1.000), where a larger relevance score indicates that the search result is more relevant to the search query and context.

In some implementations, the search application 118 may store data that can be used when ranking the applications and/or search results. For example, the search application 118 may store a dictionary and/or keywords to be used for ranking. In one specific example, each partner application may have a list of keywords associated with it that may cause the partner application and/or results to be ranked higher in the search results if the keywords are present. For example, the search application 118 may include a list of keywords associated with the YELP® application, such as restaurant keywords and cuisine type keywords. The dictionary and/or keywords may be provided to the search application by the partner server and/or the partner application.

The search application 118 can also store a variety of other data used for ranking applications and/or search results, such as user states and geolocation data associated with the partner applications. In some implementations, the search application may access the search system 102 to understand the search queries. For example, the search system 102 may include a query understanding module (not illustrated) that can process the queries.

In some implementations, the search application 118 may include a recommendation determination module 518 (hereinafter "recommendation module 518"). The recommendation module 518 may initiate a search in response to factors other than a user-inputted query. For example, the recommendation module 518 may initiate a search in response to a user accessing a specific state of the search application 118, such as accessing a specific page (e.g., unlock screen)

of the search application 118 or performing a specific gesture in the search application GUI, such as unlocking the user device 100 or swiping in from the edge of the touchscreen (e.g., left/right/up/down swiping). As another example, the search application 118 may receive a notification that causes the recommendation module 518 to initiate a search. Example notifications may include, but are not limited to, receipt of breaking news, trending topics, or a wakeup message. Another example scenario that may trigger a search may include the user device 100 being located within a defined geographic area.

The automatically generated search request may include any context or other search request data described herein. Although the search request may be generated without a user-inputted query, the search request module 508 may generate a search request including an automatically generated query. For example, the search request module 508 may generate a query based on previous user-inputted queries. As another example, the search request module 508 may generate a query based on the user's context. For example, the search request module 508 may generate a query for "restaurants" around lunch time (e.g., if the user regularly searches for restaurants at lunch time).

In some implementations, a search result data object 404 can include various instructions and data for the search application 118. The instructions included in the search result data object 404 may include instructions for the search application 118 with respect to (re) ranking search results and displaying the results. The instructions may provide partner application developers with a level of control for how their results are treated by the search application 118. In one example, instructions may indicate whether the search application 118 is permitted to reorder the search results provided by the partner application. In another example, instructions may indicate whether the search application 118 is required to use a partner application rendering. In another example, the instructions can indicate which fields of data in the search result data object 404 are required to be rendered. For example, the instructions may instruct the search application 118 to render an application title, application icon, a description, and/or ratings.

Other data included in the search result data objects 404 may include data that is descriptive of the search results. For example, the search results may include data that indicates whether the search results are personalized and/or whether advertisements are included in the search results. The search application 118 may modify how the search results are rendered based on the data. For example, the search application 118 may rank personalized results higher than non-personalized results.

As described herein, the search application 118 and/or the partner applications can rank and/or filter search results based on a variety of data (e.g., a search query, user-specific data, user context, etc.). In some implementations, the search application 118 and/or the partner applications can generate a result score (e.g., a relevance score) for each of the search results. A result score (e.g., 0.000-1.000) may indicate the rank of the search result relative to other search results. For example, a greater result score for a search result may indicate that the search result is a more relevant result to the user. In this example, a search result associated with a greater result score may be ranked higher in the displayed search results.

In one example, the search application 118 and/or the partner applications can score the search results based on the search query. For example, the search application 118 and/or the partner applications can score search results based on matches between the search query and terms associated with the search result, such as an application name, entity name, description terms, and/or terms in the search metadata. In some examples, the search application 118 and/or the partner applications can score the search results based on additional/alternative factors, such as user-specific data and context data (e.g., geolocation) described herein.

In some implementations, the search application 118 and/or the partner applications can implement scoring functions (e.g., weighted scoring functions) to generate result scores. In some implementations, the search application 118 and/or the partner applications can implement one or more heuristic models that score/filter the search results. For example, a heuristic model may include rules associated with generating result scores. In some implementations, the search application 118 and/or the partner applications may implement one or more machine learned scoring models to generate the results scores. Examples of machine learned models may include a Bayesian model, a logistic regression, a Neural Network, and/or a Gradient Boosted Decision Tree.

As described herein, the search application 118 may rank the partner applications. In these implementations, when the search application 118 groups search results by partner application, the search application 118 may maintain the ranking of the search results for each partner application while arranging the order of the rendered partner application result groups based on the rank of the partner application. Additionally, or alternatively, the search application 118 can reorder search results for each partner application and also order the partner application result groups according to the rank of the partner applications. In some implementations, the search application 118 can intermix the search results from different partner applications, where individual search results may be ranked by the respective partner applications and/or the search application 118, as described herein.

Figure 6A:
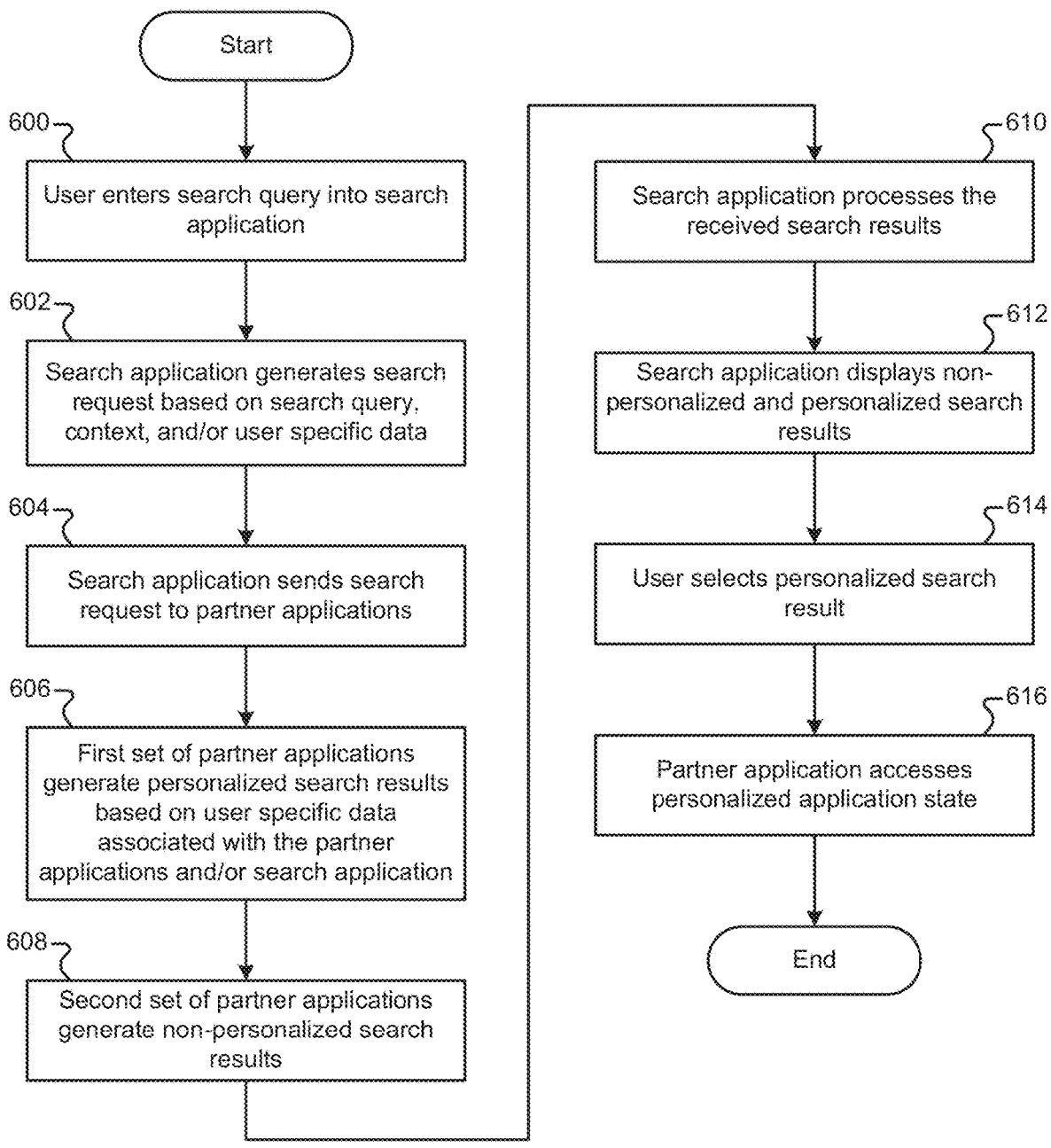
FIG. 6A illustrates an example method for generating search results that include personalized and non-personalized search results.

FIG. 6A illustrates an example method for generating search results that include personalized and non-personalized search results. Initially, in block 600, the user enters a search query into the search application 118. In block 602, the search request module 508 generates a search request based on the search query, context, and/or user-specific data associated with the search application 118. As described herein, in some cases, the search request module 508 may automatically generate a search request (e.g., without using a user-inputted search query).

In block 604, the search request module 508 sends the search request to the partner applications. In block 606, a first set of partner applications may use the received user-specific data and/or user-specific data local to the partner application to generate personalized search results. In block 608, a second set of partner applications does not use user-specific data to generate search results (referred to as "non-personalized search results").

In blocks 610-612, the search application 118 receives, processes, and displays the personalized and non-personalized search results to the user. In block 614, the user selects one of the personalized search results. In block 616, the partner application accesses a personalized application state associated with the selected personalized search result.

Figure 6C:
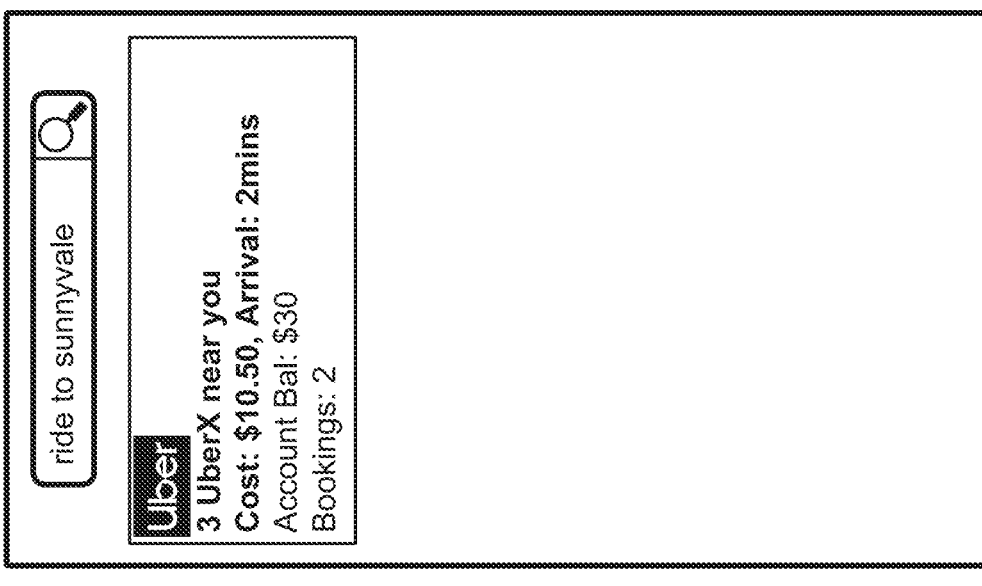
FIGS. 6B-6C illustrate GUIs including example personalized search results.
Figure 6B:
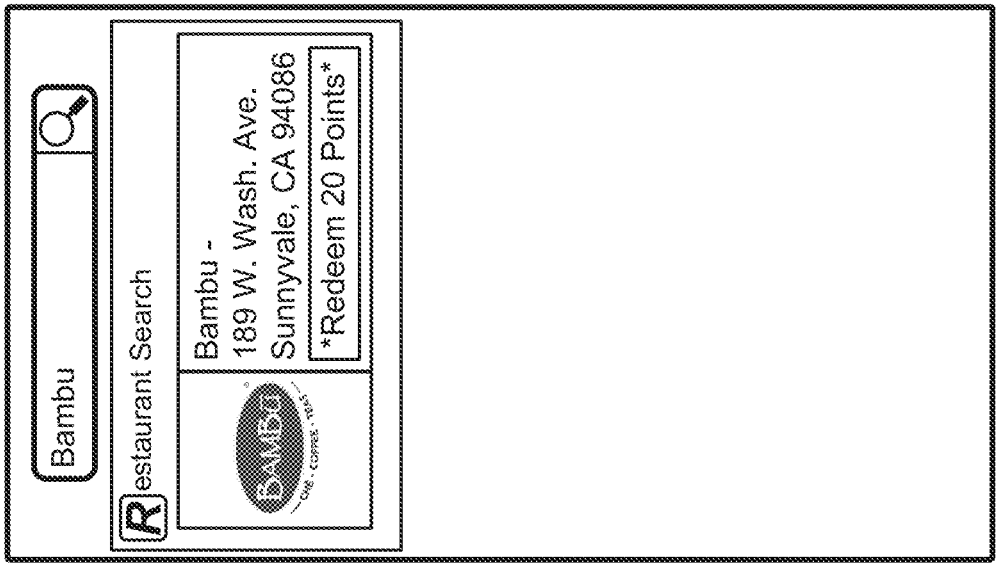

FIGS. 6B-6C illustrate example personalized search results. For example, FIG. 6B illustrates an example Restaurant Search application search result in which the link to the Bambu restaurant allows the user to redeem a personalized reward of 20 points. As another example, FIG. 6C illustrates an example UBER® application search result that includes personalized ride information. Specifically, the search result indicates that the car arrival is 2 minutes away.

Also, the search result indicates that the user's personal account balance is $30 and that they have 2 previous bookings.

In some implementations, the search system 102 can index search results and then provide search results to user devices 100 at a later time based on the indexed content. For example, the search system 102 may provide search results to user devices 100 for applications that are not installed on the user devices 100. In a specific example, if the search application 118 receives a query from a user, the search application 118 (e.g., search request module 508) may send the search query to the search system 102 to receive results for applications that are not installed on the user device 100. In this specific example, the search application 118 can display search results for non-installed applications received from the search system along with the search results from installed partner applications.

Figure 7:
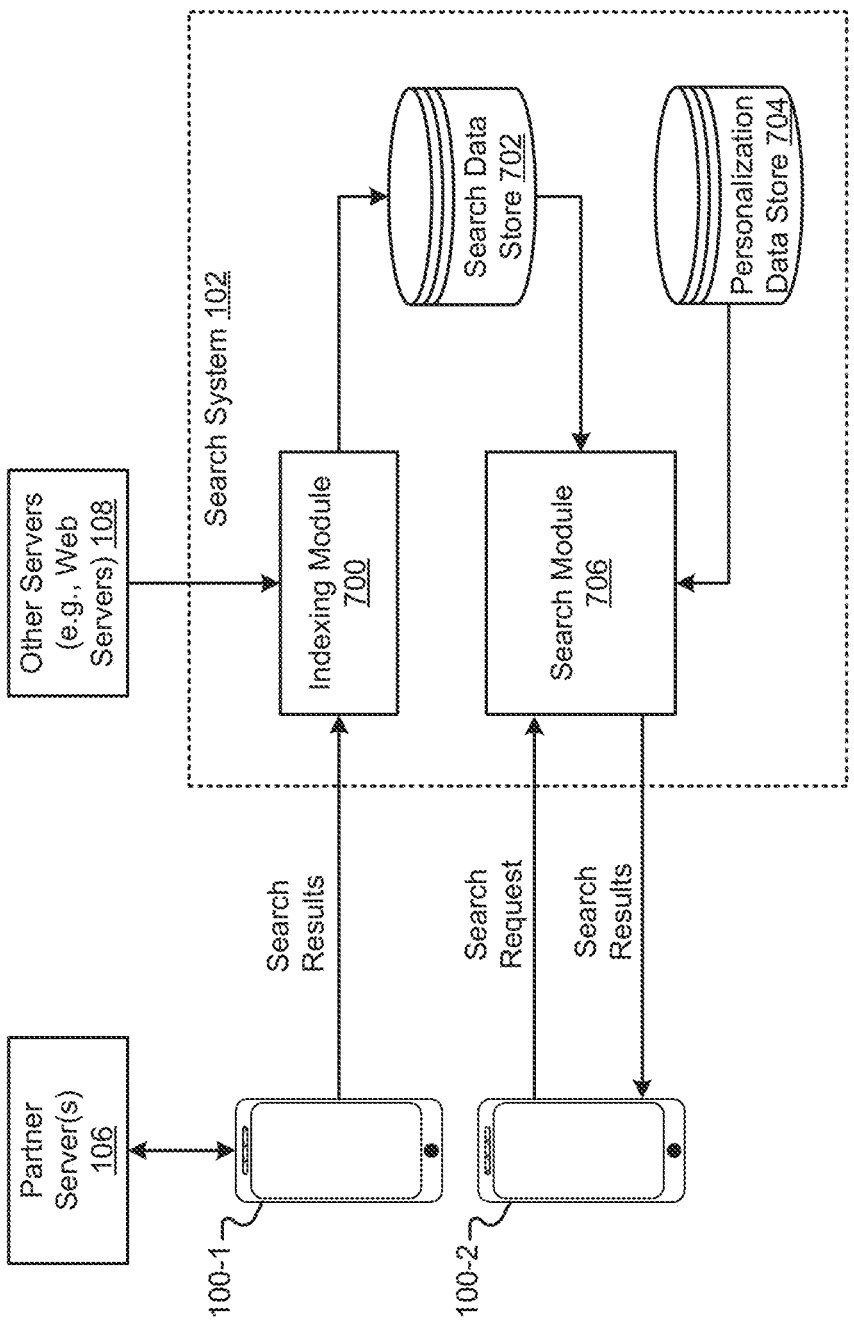
FIG. 7 is a functional block diagram that illustrates content indexing/retrieval by the search system.

FIG. 7 is a functional block diagram that illustrates content indexing by the search system 102. In FIG. 7, the upper user device 100-1 represents user devices in the past that have generated search results for partner applications. The user devices in the past have sent the search results to the search system for indexing. The lower user device 100-2 sends a search request to the search system 102 and receives search results based on the indexing of past search results.

The search system 102 includes an indexing module 700 that provides the indexing functionality. The search system 102 can index content from the partner application search results as well as from other sources, such as a web server 108. For example, the search system 102 (e.g., the indexing module 700) can include a web crawler that crawls and indexes web content, such as websites/web-apps.

The search application 118 can send, to the search system 102, any data included in partner application search results along with the search queries and context that were used to generate the search results. The indexing module 700 processes the received data and indexes it. In some implementations, the indexing module 700 may index the search result data as received from the user device. For example, the indexing module 700 may index the display data, formatting data, and result metadata. The indexing module 700 may index this data along with the search query and context used by the partner application to generate the search results.

As described herein, in some cases, the search result metadata may also include a web URL for accessing a web version of the application state. In these cases, the indexing module 700 may access the web version of the application state using the web URL. The indexing module 700 may then index the accessed web data.

The search system 102 may include a plurality of data stores, such as a search data store 702 and a personalization data store 704. The search data store 702 includes data associated with the indexed search results (e.g., a search index). The search data store 702 may include any data described herein, such as data included in the search results and/or additional indexed content (e.g., web content). In some implementations, the data may follow a schema including a variety of fields that allow for fielded searches.

The search system 102 includes a search module 706 that performs the search functionality of the search system 102. In some implementations, the user device 100-2 (e.g., the search request module 508) can request search results from the search system 102. For example, the search request module 508 may send a search request to the search system 102. In some cases, the search request may include the same data as other search requests sent to the partner applications. In other cases, the search request can include a list of installed partner applications on the user device 100-2. In these cases, the search module 706 can refrain from searching for content associated with partner applications that are installed on the user device 100-2. The search module 706 may rank and/or filter search results based on similar factors described with respect to ranking and/or filtering by the search application 118 and the partner applications.

The search module 706 may return a variety of search results. In some implementations, the search module 706 may provide search results for accessing a digital distribution platform 104 for downloading the applications that are relevant to the search request. In some implementations, the search system 102 may provide search results that direct the user's web browser to web versions of the partner applications. In some implementations, the search system 102 may provide search results that cause the user device 100-2 to download the application, or a portion of the application (e.g., Instant Apps for ANDROID®), and then access the application state associated with the search result.

In order to reduce the overall burden on the search system 102, the search application 118 may be configured to select which search results to send to the search system 102 for indexing. In some implementations, the user device 100 (e.g., search application 118) may query the search system 102 to determine whether the search system includes the search result. If the search system 102 determines that the search results have not been indexed previously, the search system 102 may request the search results from the search application 118. In some cases, partner applications may indicate to the search application 118 whether the search result should be indexed.

In some cases, the owners/operators of the search system 102 may partner with content owners, such as the owners of the partner servers 106 and the other servers 108. In these cases, the search system 102 (e.g., the indexing module 700) may retrieve and index content associated with the partner applications and other applications/websites. Initially retrieving and indexing content in this manner may help build the search data store 702 more rapidly than indexing search results from user devices 100.

In some implementations, the search system 102 can personalize results for the user based on data stored on the search system 102 (e.g., in the personalization data store 704). For example, the search system 102 may provide personalized results for non-installed applications. The search system 102 may provide personalized search results in response to search requests generated by the user and automatically generated search requests. In some examples, using personalization, the search system 102 may narrow down the number of potential search results for the user. The search system 102 may store personalized data for a user, such as previous searches and selections. The previous selections may indicate a user's application preference and preferred content type.

Figure 8:
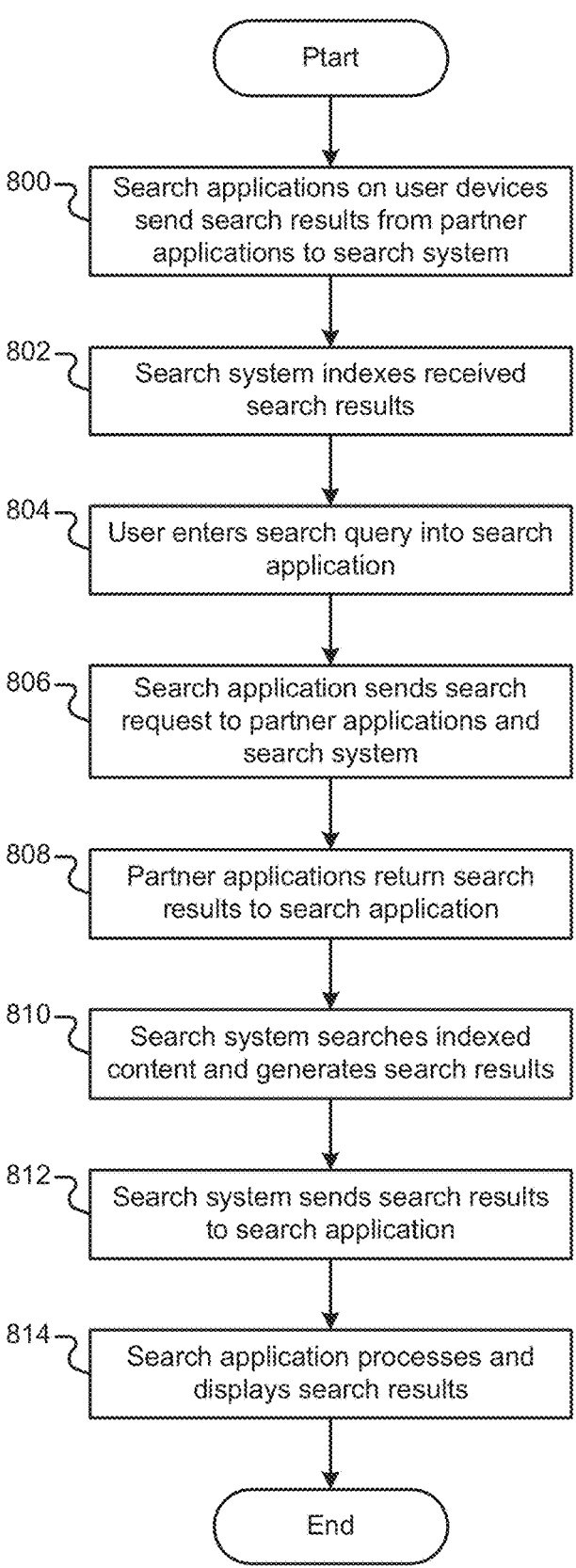
FIG. 8 illustrates an example method for indexing search results and generating search results based on the indexed results.

FIG. 8 illustrates an example method for indexing search results and generating search results based on the indexed results. Initially, in block 800, the search applications perform searches on user devices 100 and send the search results to the search system 102 for indexing. In block 802, the search system indexes the received search results.

At a later time, in block 804, a user enters a search query into their search application. In block 806, the search application 118 generates a search request and sends the search request to partner applications 114 and the search system 102. In block 808, the partner applications return search results to the search application. In block 810, the search system 102 searches indexed content and generates search results. In block 812, the search system 102 sends the generated search results back to the search application 118. In block 814, the search application 118 can process and display the search results received from the partner applications 114 and the search system 102. Although FIG. 8 illustrates the partner applications returning search results prior to the search system 102, the time at which the search results are received by the search application may vary.

Figure 9:
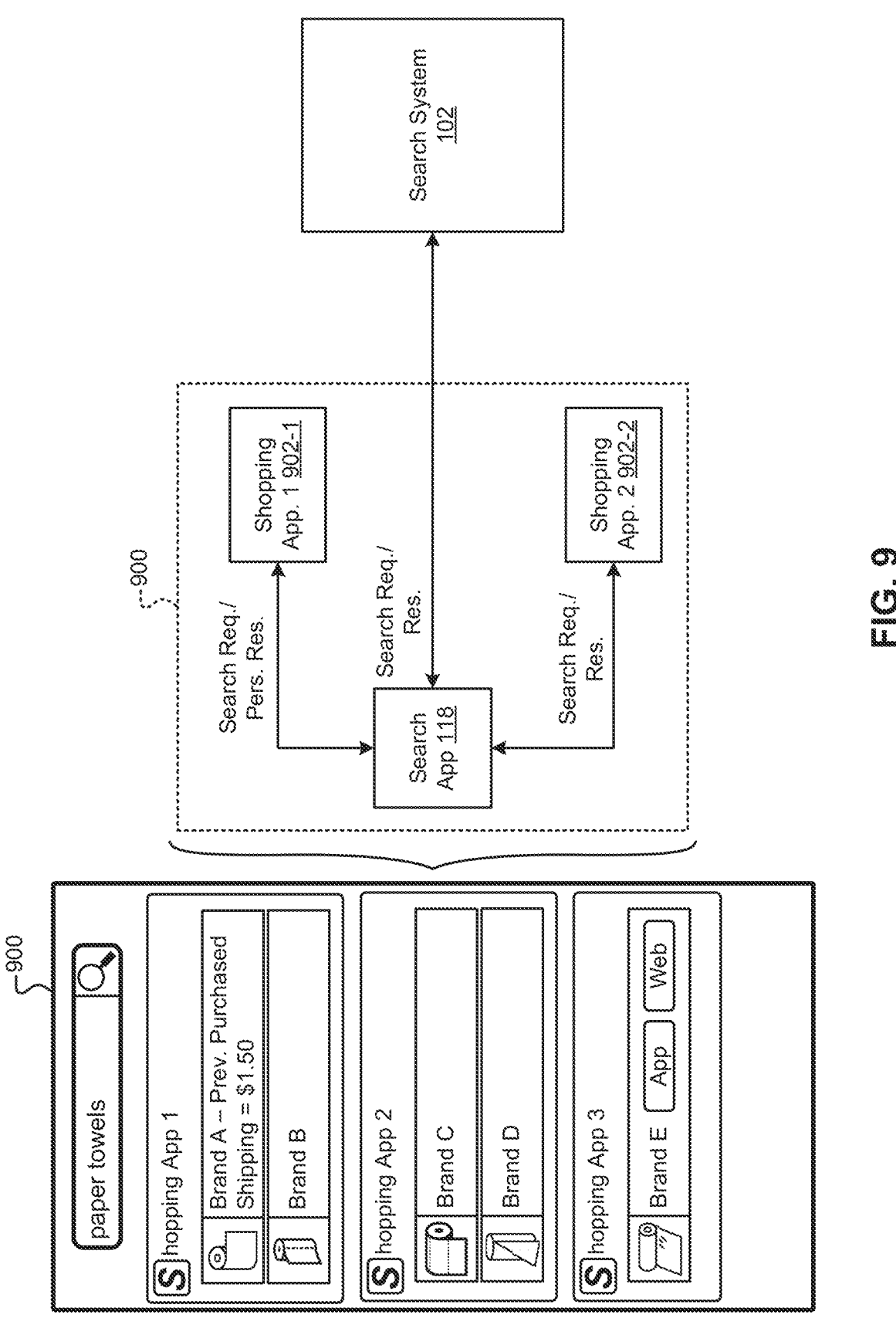
FIG. 9 illustrates an example search application GUI that receives search results from partner applications and a search system.

FIG. 9 illustrates an example user device 900 that includes a search application 118 that receives search results from an installed first shopping application 902-1 (Shopping App 1), an installed second shopping application 902-2 (Shopping App 2), and a remote search system 102. In FIG. 9, the search application 118 receives a user search query for "paper towels." The search application 118 queries the first and second shopping applications 902-1, 902-2. The search application 118 also queries the search system 102. The search application 118 receives personalized search results from the first shopping application 902-1. Specifically, the search application 118 receives a search result for Brand A paper towels that indicates to the user that Brand A paper towels have been previously purchased in the first shopping application 902-1 by the user. The personalized search result also indicates a shipping cost for the user's shipping location, such as a stored shipping location, as opposed to the user's current location. The first shopping application 902-1 and the second shopping application 902-2 also return non-personalized results for Brand B, Brand C, and Brand D paper towels.

The search application 118 receives search results for Shopping Application 3 from the search system 102. Shopping Application 3 is not installed on the user device 900. The search application 118 provides the user with the option of opening the Brand E paper towel webpage on the Shopping Application 3 website. For example, the user may select (e.g., touch/click) the "Web" GUI element to access the Brand E paper towel webpage. The search application 118 also provides the user the option of accessing the Brande E paper towel application state by selecting the "App" GUI element. In this example, in response to the user selecting the "App" GUI element, the user device 900 may download Shopping App 3 from a digital distribution platform 104, install Shopping App 3, and then access the Brand E page in the installed Shopping App 3. Note that the search results provided by the search system 102 may have been acquired by indexing search results received from one or more user devices via the search applications installed on the one or more user devices.

Modules and data stores illustrated herein represent features that may be included in the systems, devices, and applications of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more CPUs, GPUs, digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provide communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

What is claimed is:

1. A user device comprising:
memory including a search application; and
a processing unit configured to execute the search application, wherein executing the search application causes the processing unit to:

automatically generate a search request;
send the search request to a plurality of target applications included in the memory;
receive a set of search results from each of the target applications, wherein each search result includes application state access data configured to access an application state of the target application associated with the search result;
generate relevance scores for the received search results based on ranking metadata values received from the target applications that indicate the relevance of the search results as calculated by the individual target applications;
rank the search results based on the relevance scores associated with the search results;
display the ranked search results;
detect user selection of one of the displayed search results;
send the application state access data associated with the selected search result to the target application associated with the selected search result.

2. The user device of claim 1, wherein executing the search application causes the processing unit to automatically generate the search request in response to a user accessing a page in the search application.

3. The user device of claim 1, wherein executing the search application causes the processing unit to automatically generate the search request in response to a user performing a gesture in a graphical user interface for the search application.

4. The user device of claim 1, wherein the search request includes at least one of geolocation, time of day, one or more previous search queries, one or more user preferences, and a user state of motion.

5. The user device of claim 1, wherein executing the search application causes the processing unit to:
generate a search query; and
include the search query in the search request.

6. The user device of claim 5, wherein the ranking metadata values received from the target applications indicate the relevance of the search results to the search query.

7. The user device of claim 5, wherein executing the search application causes the processing unit to generate the search query based on at least one of geolocation, time of day, one or more previous search queries, one or more user preferences, and a user state of motion.

8. The user device of claim 1, wherein executing the search application causes the processing unit to rank the search results based on a user's historic usage of the target applications.

9. The user device of claim 1, wherein a first set of search results associated with a first target application is personalized by the first target application based on a user's interactions with the first target application.

10. The user device of claim 1, wherein a first plurality of received search results each include application state access data configured to access local content stored in the memory, and wherein a second plurality of received search results each include application state access data configured to access remote content.

11. A non-transitory computer-readable medium comprising computer-executable instructions, the computer-executable instructions causing a processing unit of a user device to:
automatically generate a search request;
send the search request to a plurality of target applications included on the user device;

receive a set of search results from each of the target applications, wherein each search result includes application state access data configured to access an application state of the target application associated with the search result;

generate relevance scores for the received search results based on ranking metadata values received from the target applications that indicate the relevance of the search results as calculated by the individual target applications;

rank the search results based on the relevance scores associated with the search results;

display the ranked search results;

detect user selection of one of the displayed search results;

send the application state access data associated with the selected search result to the target application associated with the selected search result.

12. The non-transitory computer-readable medium of claim 11, wherein the instructions cause the processing unit to automatically generate the search request in response to a user accessing a page in the search application.

13. The non-transitory computer-readable medium of claim 11, wherein the instructions cause the processing unit to automatically generate the search request in response to a user performing a gesture in a graphical user interface for the search application.

14. The non-transitory computer-readable medium of claim 11, wherein the search request includes at least one of geolocation, time of day, one or more previous search queries, one or more user preferences, and a user state of motion.

15. The non-transitory computer-readable medium of claim 11, wherein the instructions cause the processing unit to:

generate a search query; and include the search query in the search request.

16. The non-transitory computer-readable medium of claim 15, wherein the ranking metadata values received from the target applications indicate the relevance of the search results to the search query.

17. The non-transitory computer-readable medium of claim 15, wherein the instructions cause the processing unit to generate the search query based on at least one of geolocation, time of day, one or more previous search queries, one or more user preferences, and a user state of motion.

18. The non-transitory computer-readable medium of claim 11, wherein the instructions cause the processing unit to rank the search results based on a user's historic usage of the target applications.

19. The non-transitory computer-readable medium of claim 11, wherein a first set of search results associated with a first target application is personalized by the first target application based on a user's interactions with the first target application.

20. The non-transitory computer-readable medium of claim 11, wherein a first plurality of received search results each include application state access data configured to access local content included on the user device, and wherein a second plurality of received search results each include application state access data configured to access remote content.

* * * * *